US009438680B1

(12) United States Patent
Bingham, Jr. et al.

(10) Patent No.: US 9,438,680 B1
(45) Date of Patent: Sep. 6, 2016

(54) VALIDATING DATA COMPLIANCE IN A WEB SERVICES FRAMEWORK

(75) Inventors: Paris E. Bingham, Jr., Aurora, CO (US); Michael J. Wookey, Los Gatos, CA (US)

(73) Assignee: ORACLE AMERICA, INC., Redwood Shores, CA (US)

( * ) Notice: Subject to any disclaimer, the term of this patent is extended or adjusted under 35 U.S.C. 154(b) by 1976 days.

(21) Appl. No.: 11/151,968

(22) Filed: Jun. 14, 2005

(51) Int. Cl.
  *G06F 15/16* (2006.01)
  *H04L 29/08* (2006.01)

(52) U.S. Cl.
  CPC ..................... *H04L 67/16* (2013.01)

(58) Field of Classification Search
  CPC .............. H04L 29/12113; H04L 41/5038; H04L 41/5045; H04L 61/1541; H04L 63/08; H04L 67/02; H04L 67/10; H04L 67/16; G06F 9/541
  USPC ......................................................... 709/218
  See application file for complete search history.

(56) References Cited

U.S. PATENT DOCUMENTS

| | | | | |
|---|---|---|---|---|
| 2003/0118353 | A1* | 6/2003 | Baller et al. ..................... | 399/8 |
| 2003/0120593 | A1* | 6/2003 | Bansal et al. .................. | 705/39 |
| 2004/0093580 | A1* | 5/2004 | Carson et al. ................. | 717/101 |
| 2004/0133876 | A1* | 7/2004 | Sproule .......................... | 717/105 |
| 2004/0205129 | A1* | 10/2004 | Bongiorni et al. ........... | 709/204 |
| 2005/0193135 | A1* | 9/2005 | Owen et al. .................. | 709/230 |

OTHER PUBLICATIONS

Daniela Florescu, Andreas Grunhagen, Donald Kossmann, XL: an XML programming language for Web service specification and composition, Computer Networks, vol. 42, Issue 5, The Semantic Web: an evolution for a revolution, Aug. 5, 2003, pp. 641-660, ISSN 1389-1286.*

Levy, R.; Nagarajarao, J.; Pacifici, G.; Spreitzer, A.; Tantawi, A.; Youssef, A., "Performance management for cluster based Web services," Integrated Network Management, 2003. IFIP/IEEE Eighth International Symposium on , vol., No., pp. 247-261, Mar. 24-28, 2003.*

(Continued)

*Primary Examiner* — Christopher Biagini
(74) *Attorney, Agent, or Firm* — Marsh Fischmann & Breyfogle LLP (57) ABSTRACT

A method, and associated system, for enforcing compliance with data definitions in an information or conceptual model. The method includes storing a set of data models, which define model parameter definitions, having a content based on data definitions of the conceptual model. A validator is positioned between a registry service and services use data definitions to define their data parameters. The registry service stores registered services in a service repository. The validator processes a registration request from one of the services that includes the data definitions for the parameters of the service. The processing includes accessing the data models and comparing each of the data definitions to a corresponding model parameter definition. When the registration request is determined compliant with the conceptual model, the service is deployed to the service registry. Typically, only registration requests processed by the validator are deployed to the service registry.

23 Claims, 3 Drawing Sheets

(56) References Cited

OTHER PUBLICATIONS

Reiko Heckel, and Leonardo Mariani, Automatic Conformance Testing of Web Services , Tuesday, Mar. 1, 2005, Springer Berlin / Heidelberg, vol. 3442/2005, pp. 34-48.*

Tsai, W.T.; Paul, R.; Cao, Z.; Yu, L.; Saimi, A., "Verification of Web services using an enhanced UDDI server," Object-Oriented Real-Time Dependable Systems, 2003. (WORDS 2003). Proceedings of the Eighth International Workshop on , vol., No., pp. 131,138, Jan. 15-17, 2003.*

\* cited by examiner

VALIDATING DATA COMPLIANCE IN A WEB SERVICES FRAMEWORK

BACKGROUND OF THE INVENTION

1. Field of the Invention

The present invention relates, in general, to use of information models in service frameworks such as Web service frameworks, as a "source-of-record" for the format of data used and exchanged by services, and, more particularly, to a method and corresponding system for validating compliance with a conceptual model that provides data definitions or data format definitions for a service framework.

2. Relevant Background

There is a growing trend within the information and computer industries to operate enterprise-scale software systems and other large computer networks using a service oriented architecture (SOA) foundation. For example, Web services are often provided in an SOA-based system and used to promote an environment for systems that is loosely coupled and interoperable. The SOA facilitates configuration of entities, such as services, registries, contracts, proxies, and the like, to maximize loose coupling of the services and reuse of applications and data to achieve desired outcomes. The services in an SOA-based system are generally discoverable on the network or framework, are self-contained, have a network-addressable interface, and are location-transparent.

An important feature of services in an SOA-based system is interoperability that allows the systems using different platforms and languages to communicate with each other. However, such interoperability is only truly achievable if the SOA-based system implements an integrated data model that provides the source of all data definitions and interface definitions required by the services, i.e., a "source-of-record" for the data definitions and/or data formats. In this regard, within existing SOA implementations, an Information Model (IM) is sometimes provided (or at least discussed as a desirable feature) that defines common and consistent vocabulary and semantics for the information that is passed between the components and services of the SOA. However, the IM is only an abstract or conceptual construct, and the IM is not implemented in the SOA to define data that is operated on and transmitted among the services. Instead, the realization or implementation is done through the use of concrete data models that govern the format of the information flowing within the SOA.

Ideally, the concrete data models are created by each developer of a service based on the IM or conceptual model provided for the SOA-based system. Unfortunately, in practice, some concrete data models or data definitions used by the services of the SOA-based system are derived from the IM or conceptual model while many are not or at least vary in a manner that can affect communications among the services. For example, a first application used to provide a service may define a data type or variable in a first manner (such as "customer" with a first data description) while a second application may define the same data type or variable in a second, different manner (such as "customer" with a second data description). When the two services attempt to communicate, there will be a breakdown when one service receives unexpected information or data in a format that is incompatible with its concrete data model. As a result, interoperability within an SOA-based system can be significantly reduced by the lack of synchronicity between the IM or conceptual model and the concrete data models implemented in practice by the services of the SOA-based system.

In current practice, the burden of validating that data formats and data definitions used by services comply with the conceptual model or source-of-record is placed either on the producing component/service or on the consuming or receiving component/service. Neither validation and enforcement technique has produced consistent or acceptable results. When the burden is placed on the producing service, the producing service must insure that any information it sends conforms with the data definitions in the conceptual model or IM prior to issuance or transmitting the data or information. When the burden is placed on the receiving or consuming service, the consuming service is forced to validate compliance of the received data or information with the conceptual model or IM and when found to be non-conforming, the consuming service must reject the invalid data or information.

A problem with either of these approaches to source-of-record validating is that there is overhead, i.e., processing time and the like, associated with validating the data and enforcing compliance, and this validating/enforcing overhead is experienced by the producing or consuming services on every exchange of information or data between services in such a service framework or environment. In other service framework implementations, the system is configured to forego or skip validation or model compliance enforcement. In these implementations, the consuming service simply trusts that the information exchanges are formatted correctly or in compliance with the source-of-record conceptual model. Unfortunately, systems trusting the producing service do not provide any assurance that the data is being validated against a source-of-record conceptual model, and likewise, even systems calling for validation and enforcement to be performed by the producing and consuming services do not include components for determining if such validation is performed correctly or in accordance with a source-of-record conceptual model or IM.

Hence, there remains a need for a method and system for managing the use of conceptual models, such as IMs, as a basis for creating concrete data models or data definitions implemented by services for communicating in a computer network or system (such as an SOA-based system). Preferably, such a method and system would enhance synchronization between the conceptual model governing the services framework and the concrete data models used in an ongoing basis by the services.

SUMMARY OF THE INVENTION

The present invention addresses the above and other problems by providing a method and corresponding systems for validating and enforcing compliance of services or other components in a network or framework with a governing or source-of-record conceptual model of data definitions. The invention provides a technique for requiring that all information that flows within a service framework or network is governed by the abstract conceptual model (e.g., an Information Model (IM) or the like). The method and system of the invention recognizes that all services wishing to communicate within a services framework (such as an SOA implementation) register their existence and their proposed information exchange data types or definitions with a registry. With this in mind, the method and system perform validation of those proposed data types or definitions against the source-of-record conceptual model at registration time, rather than at information exchange time as was the case with prior validation practices. As a result, the method and system of the invention eliminates the overhead associated with a per-message, per-transaction, or per-operation data validation model, but yet provides assurance that information flow is governed by the source-of-record conceptual model and its data definitions.

More particularly, a method is provided for enforcing compliance with data definitions in a source-of-record conceptual model. The method includes storing a set of data models, which define model parameter definitions, having a content and format based on the data definitions of the conceptual model. A conceptual model validator is provided that has access to the data models and that is positioned between a registry service and a plurality of services having a description of service with a data descriptor providing data definitions for service parameters. The registry service stores registered services in a service repository for later use by the services of the framework or system. The method continues with the validator processing a registration request from one of the services. The registration request includes the data definitions for the parameters of the service, and the processing includes accessing the data models and comparing each of the data definitions to a corresponding one of the model parameter definitions. When the registration request is determined compliant with the conceptual model, the method includes deploying or registering the service with the service registry. The method may further include initially generating the set of data models from the conceptual model, such as with a format that is the same as that used by the services for registration requests to facilitate comparisons. In some preferred embodiments, only registration requests processed by the validator and found to be compliant with the conceptual model are deployed to the service registry.

DETAILED DESCRIPTION OF THE PREFERRED EMBODIMENTS

The invention is generally directed to providing a method and system for validating and enforcing (i.e., governing) the compliance of services that are exchanging data in a service framework with data definitions and/or formats provided in an abstract conceptual model, such as an Information Model (IM). In other words, the method and system of the present invention acts to provide a desirable facet of validating compliance with an abstract conceptual model or IM that provides the source-of-record for the format of information flowing between software components (such as services and particularly, Web services) in a loosely-coupled, componentized, software system, such as one built on Services Oriented Architecture (SOA) principles. The present invention addresses the validation overhead problems and enforcement problems associated with prior techniques that placed the burden on consuming services or on producing services.

In brief, the method involves providing a conceptual model validator between services (or clients) and a service registry (or server) to intercept registration requests. The intercepted requests are parsed to obtain data descriptions and these data descriptions are compared with data models or definitions previously formed from the source-of-record conceptual model (e.g., an IM governing the service framework). If valid, the service is allowed to register and deploy, but if not, the registration request is rejected. These and other features of the present invention are explained in detail in the following description.

In the following discussion, computer and network devices (or "elements"), such as the software and hardware devices within the system 100, are described in relation to their function rather than as being limited to particular electronic devices and computer architectures and programming languages. To practice the invention, the computer and network devices or elements may be any devices useful for providing the described functions, including well-known data processing and communication devices and systems, such as application, database, Web, blade, and entry level servers, midframe, midrange, and high-end servers, personal computers and computing devices including mobile computing and electronic devices with processing, memory, and input/output components running code or programs ("applications", "tasks" within such applications, and "services") in any useful programming language, and server devices configured to maintain and then transmit digital data over a wired or wireless communications network.

Similarly, data storage systems and memory components are described herein generally and are intended to refer to nearly any device and media useful for storing digital data such as disk-based devices, their controllers or control systems, and any associated software. Data, including transmissions to and from the elements of the network 100 and among other components of the network/systems 100, such as between services, typically is communicated in digital format following standard communication and transfer protocols, such as TCP/IP, HTTP, HTTPS, FTP, and the like, or W or non-IP wireless communication protocols. The invention is particularly suited for controlling data flow and use by web services in a SOA-based system and/or web services framework. However, the concepts of the invention are readily applicable to any computer system with services or applications running in a distributed or network environment.

Figure 1:
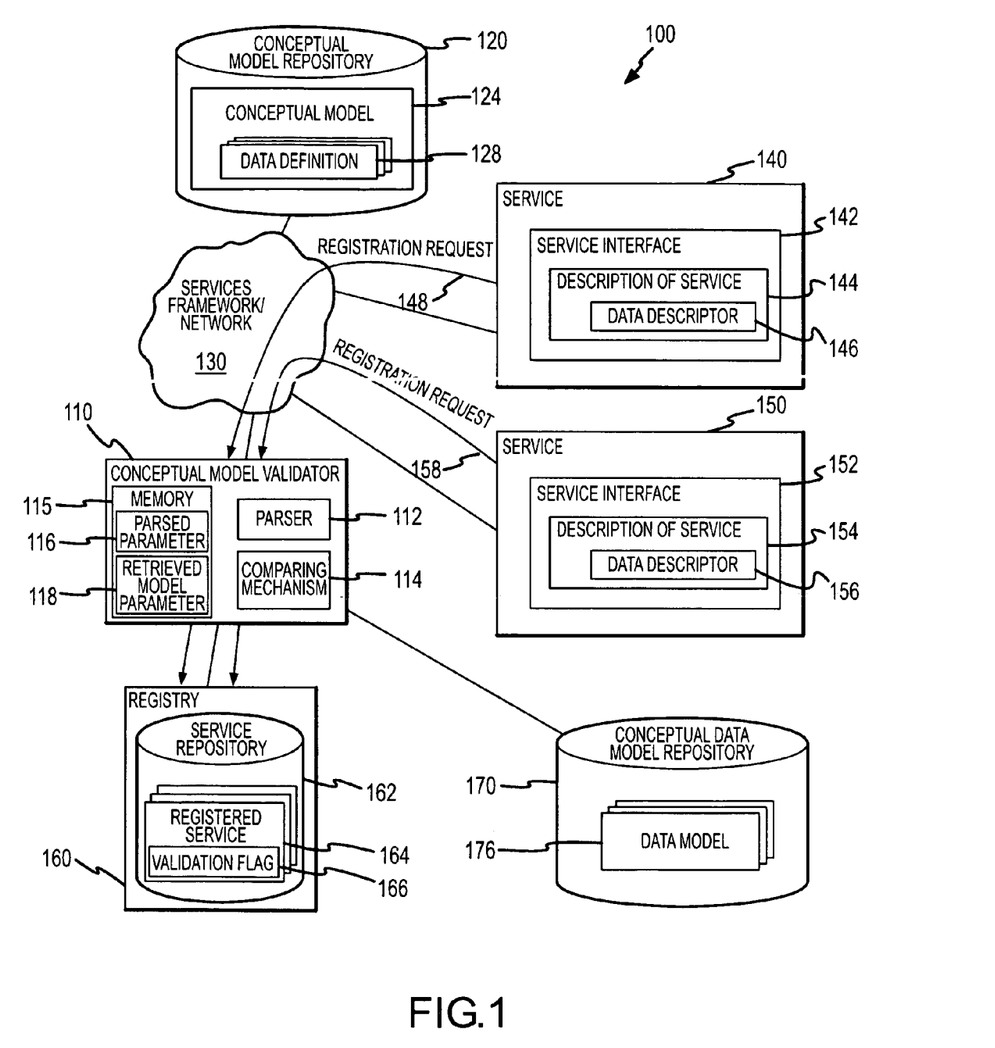
FIG. 1 illustrates in block form a data validation or governance network or system according to the present invention having a conceptual model validator positioned between services (e.g., client components) and a services registry (e.g., server component)

FIG. 1 illustrates a data governance network or system 100 that is adapted according to one embodiment of the invention for validating compliance of data exchanged among components or services with a conceptual model, e.g., by verifying compliance of new or modified data descriptors within new or modified service interfaces with data definitions of a conceptual model, e.g., an IM, governing data definitions within the system 100. The system 100 may take a variety of forms to practice the invention and generally, may be an arrangement of computing and/or electronic devices that are communicatively linked by a wired or wireless communications network or services framework 130 (such as a web services framework).

As shown, the system 100 includes a conceptual model validator 110 that is positioned between a registry 160 (e.g., a server component) and a plurality of services 140, 150 or similar components (e.g., client components) in the system 100 that transmit registration requests 148, 158 over services framework/network 130. The registration requests 148, 158 generally include data descriptors (such as those found in a description of service) and/or data model definitions. As is explained below, the validator 110 includes a parser 112 for parsing the registration request 148, 158, which may take the Web Services Description Language (WSDL) form, and to retrieve each parameter which is stored in memory 115 as parsed parameters 116. A comparing mechanism 114 is provided that accesses a concrete data model 176 in common repository 170 which is constructed to be a normative definition of a conceptual data definition 128 of the conceptual governing or source-of-record model 124. The retrieved model parameter 118 is also stored (at least temporarily) in memory 115. The comparing mechanism 114 then acts to compare the two data definitions, and when a match is obtained for all parameters or data definitions in the request 148, 158, the registration request 148, 158 is validated and marked with a validation flag 166 as it is allowed to be deployed or registered with the registry 160 as shown stored in service repository 162 as registered services 164.

Additionally, the system 100 includes a conceptual model repository 120, such as a memory device, that stores a conceptual model 124, which may be generated as an initial process in creating and configuring the system 100. The conceptual model 124 includes a set of data descriptions or definitions 128 that define a common and consistent vocabulary and semantics for information within the system 100 (e.g., information passed over the framework 130 between services 140, 150), and the conceptual model 124 may be thought of as the "source-of-record" for information formats in the system 100. The conceptual model 124 may take a number of forms to provide the desired data definitions 128. In one embodiment, for example, the conceptual model is a conceptual model representation of an information model (1M) that is provided in diagrammatic or pictorial form. In a specific case, this diagrammatic or pictorial form is configured according to the Unified Modeling Language (UML), i.e., the conceptual model 124 is a UML diagram that includes the data definitions 128.

The system 100 further includes a plurality of services 140, 150 that operate on the services framework 130 to perform various functions, such as processing data that is preferably configured to conform to the conceptual model 124. During operation of the system 100, the services 140, 150 each attempt to register with the registry 160 by transmitting registration requests 148, 158. The registry 160 (such as a web services registry or the like) is used by services for finding, binding, and executing services that match their criteria. The registry 160 includes a service repository 162 that stores registered services (or contracts or service interface information for such services)) 164, which according to the invention are first validated as complying with conceptual model 124 data definitions 128 by validator 110. During operation of the system 100, the registry 160 acts as a network-based directory that contains the available services on the framework 130 by providing consumers of services (e.g., other services 140, 150) with access to the registered services 164. Generally, to register, the services 140, 150 transmit a contract or registration request 148, 158 describing its service interface 142, 152 to the registry 160. The interface 142, 152 (and registration request 148, 158) provides a description of services 144, 154 for the service 140, 150 and significant to this invention, the registration request 148, 158 includes a data descriptor 146, 156 (or definition of parameters used by the service 140, 150 as discussed with reference to FIG. 2) that defines how information is formatted within the service 140, 150, e.g., provides the data definitions used by the service 140, 150.

Figure 2:
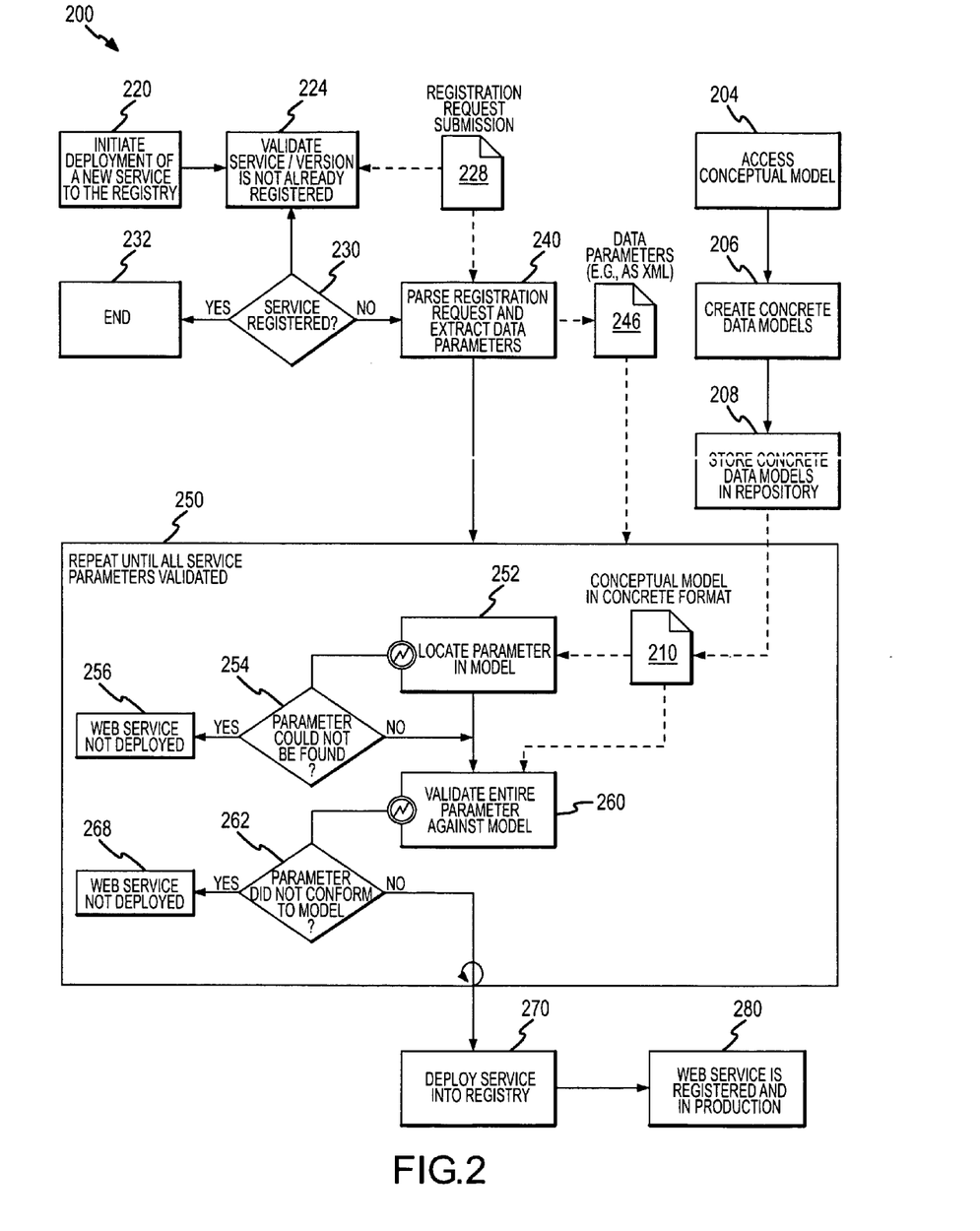
FIG. 2 illustrates a method for validating data formats utilized by services against a source-of-record conceptual model, which may be performed by the system of FIG. 1 during registration of a service with the services registry.
Figure 3:
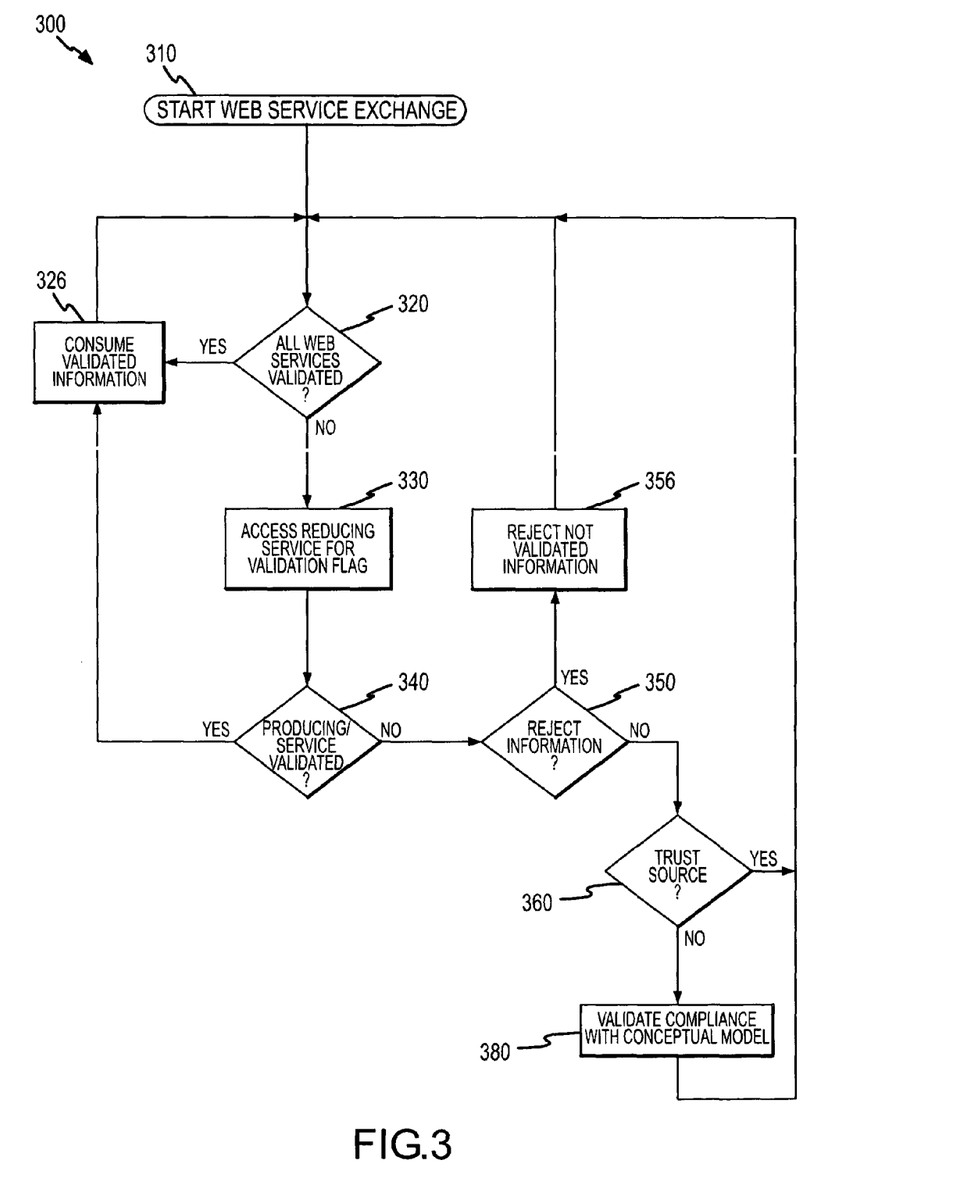
FIG. 3 illustrates a method of operating a services framework to exchange data or information among services (e.g., Web services).

As will become clear from the description of FIGS. 2 and 3, the system 100 is adapted for assuring that the data descriptors 146, 156 used by the services 140, 150 are consistent or synchronized with the data definitions 128 in the conceptual data model or source-of-record 124. To this end, the system 100 includes a concrete data model repository 170, e.g., a memory device, storing concrete data models 176 that are created based on the data definitions 128 of the conceptual model 124. For example, in some embodiments, the services 140, 150 are Web services that transmit content across the services framework 130, and in many cases, the content is transferred as markup language packets (e.g., as eXtensible Markup Language (XML) packets or documents). In such embodiments, the data models 176 may take the form of schemas or definitions of the format of information to be provided in such markup language packets. In one exemplary embodiment, Web services 140, 150 transmit registration requests 148, 158 configured according to the Web Services Description Language (WSDL), which are used as carriers for data models in service descriptions 144, 154. In one SOA implementation, the concrete representation provided in the data models 176 are provided as XML Schema Definitions (XSDs). The format or form used for the data models 176 is selected to be consistent with the data descriptors 146, 156 used by the services 140, 150 in the description of services 144, 154 and in the associated registration requests 148, 158 to enable ready comparison by the comparing mechanism 114 of the parsed parameters 116 and the model parameters 118 from the common repository 170.

The system 100 is intended to provide an exemplary configuration that may be used to implement components useful for validating and enforcing compliance of services with a conceptual model 124 in a large scale software environment such as in a SOA-based, enterprise-scale, web services framework or platform. With an understanding of this exemplary system 100, it may now be useful to more fully describe the validating and enforcing methods of the present invention with reference to FIGS. 2 and 3. The invention provides a rigorous process and methodology for governing compliance with a conceptual model 124 and uses the components of the system 100 together to provide such data compliance validation and enforcement, i.e., conceptual model/concrete data model synchronization, even at an enterprise scale.

FIG. 2 illustrates a method 200 according to the present invention of validating and enforcing compliance with data definitions in a source-of-record conceptual model. The method 200 begins with the creation of a common repository (such as concrete data model repository 170 of FIG. 1) containing normative data models created from the source-of-record conceptual model or IM (such as data models 176 formed from data definitions 128 of FIG. 1). These initial steps are shown in FIG. 2 as beginning with step 204 in which the conceptual model with its abstract data definitions being provided and then accessed. At 206, a set of concrete data models or normative data models are created from this accessed conceptual model and at 208, are stored in a common repository with access provided to a validator as shown with conceptual model in concrete format 210. For example, in one embodiment, the concrete format is selected to be XSDs to be consistent with the use of XML formatted data descriptors by the services, i.e., the format of the conceptual model in concrete format 210 is preferably the same as the format of parameter or data definitions in the registration requests submitted by the components or services of the governed computing environment.

With reference to FIG. 1, the method 200 may include a step (not shown in FIG. 2) of interposing in IM or conceptual model validator 110 between the client and server portions of the system 100, i.e., between the services 140, 150 and the registry 160. The validator 110 acts to validate compliance with the conceptual data model 124 by inspecting registration requests 148, 158 for their data model definitions that are compared with data models 176. Only validated registration requests 148, 158 are allowed to register 164 with registry 160. This technique moves the validating and enforcing burden to a one time process that occurs at registration that is in stark contrast to the prior practices of letting the component/service 140, 150 register virtually any data descriptions that it wishes to register and thus, placing validation and enforcement burdens on the clients or services 140, 150. The described inventive technique significantly reduces the validating and enforcing burdens on the system 100 and also insures that such validation is properly completed (i.e., the registration requests 148, 158 are not registered if not compliant with data definitions 128 of the source-of-record conceptual model 124).

With the validator 110 in place, the method 200 continues at 220 with the initiation of deployment of a new or modified service 140, 150 to the registry 160, which may include a developer or deployment engineer creating a new service 140, 150 along with its service interface 142, 152 including a data descriptor 146, 156 defining the format of each of the service's parameters. At 224, the method 200 includes validating that the service is not already registered and if not, generating a registration request 228 for submittal to the registry 160. At 230, it is determined whether the service is registered and if already registered, the method 200 ends at 232. If not yet registered, the method 200 continues at 240 with the conceptual model validator 110 parsing with its parser 112 the registration request 228 to extract the data parameters 246 (or 116 in FIG. 1), which may be in XML or another format.

The subroutine 250 is then repeated by the comparing mechanism 114 of the validator 110 until all service parameters in the registration request 228 are validated (or determined invalid). At 252, the comparing mechanism 114 locates a parameter in the data model 176, and may retrieve the parameter 118 or work from the model 176. At 254, the comparing tool 114 may determine that the parsed parameter 246 could not be found in the data model 176, and if so, at 256, the service registration request is denied/rejected and the service is not deployed.

If the parameter 246 is found in the model 176, the method 200 continues at 260 with the comparing mechanism 114 validating the entire parameter against the model (e.g., the parsed parameter 116 against the retrieved model parameter 118). At 262, the comparing tool 114 determines if the parameter properly conformed, and if not, at 268, the service is not deployed (i.e., the registration request is denied or rejected). If validated, the method 200 continues by processing additional parameters by repeating process 250 or by flagging the service as validated and deploying the service corresponding to the registration request at 270 when all parsed parameters are determined valid. The method 200 ends with the service 164 with its validation flag 166 being registered with and in production in registry 160.

The method 200 illustrates that the combined use of the common repository 170 with data models 176 built from conceptual model 124 and the validator 110 allows examination of each registration request or description from the services 140, 150 during the registration operation. The validator 110 acts to insure that all data model definitions contained in these registration requests 148, 158 match a counterpart normative definition in the common repository 170. Any registration requests 148, 158 that contain definitions that are not in the normative or common repository 170 are rejected as being in error, and the issuing component or service 140, 150 is not registered with the registry 160. Registration requests 148, 158 that are validated completely by the validator are allowed to register and are flagged as validated as shown by registered services 164 in service repository 162 and validation flags 166 for each such service 164.

In a preferred embodiment of system 100, all components or services 140, 150 register with the registry 160 by going through the validator, and in this embodiment, the method 200 insures that compliance to the conceptual model 124 occurs and the method 200 also removes the overhead of doing validation/enforcement at information exchange time. In other embodiments of system 100, at least some of the services 140, 150 are not required to pass through the validation interposer 110, and in such embodiments, components or services wishing to communicate only with other validated components can check the service description 144, 154 for validation (e.g., a validation flag may be present). The method 300 of FIG. 3 illustrates operation of a Web services framework that employs the validation method 200 and in which not all services are required to register via the validator 110 shown in FIG. 1.

As shown, the method 300 begins at 310, such as with configuring a system 100 by providing a validator 110 between Web service components 140, 150 and registry 160 and by providing a concrete data model repository 170 with data models 176 built based on conceptual data model 124. At 320, the method 300 continues with determining whether the system 100 is adapted such that all Web services 140, 150 must register with the registry 160 via validator 110 (i.e., are all services 140, 150 necessarily validated during registration operations?). If yes, the method 300 continues at 326 with Web services 140, 150 "trusting" that all registered services 164 are in compliance with the source-of-record conceptual model 124 and not having to perform any additional validation/enforcement to consume information on the services framework 130.

If all Web services 140, 150 do not have to register via validator 110, the method 300 continues at 330 with the consuming service accessing the service description of the producing service for a validation flag. This may be achieved by accessing the registry 160 or by accessing the description of services 144, 154 of the service component 140, 150 itself which may be configured to be flagged by the validator 110. At 340, the method 300 continues with determining if the producing service is valid based on the existence of a validation flag 166. If validated, the method 300 continues with the consuming Web service consuming the validated information at 326.

If not validated at 340, the method 300 continues with a determination of whether the information/service 140, 150 is to be rejected, and if so, the method 300 continues with rejecting 356 the information/service 140, 150. For example, there may be implementations of Web service frameworks in which only services 140, 150 that are validated by a validator 110 are to be trusted and utilized. In other cases, it may be useful for services to be able to validate services that are not registered via the validator 110. In these situations, the method 300 continues at 360 with a determination if the producing Web service 140, 150 should be trusted with no further validation (burden placed on producing Web services who do not register via validator 110 to self-validate to the conceptual model). If yes, consumption can occur and the method 300 continues at 320. If not simply trusted at 360, the method 300 continues with the consuming Web service 140, 150 acting to validate compliance of the producing Web service with the conceptual model 124 (e.g., by accessing the common repository 170 and performing the tasks of the validator 110 or taking other steps to validate the data of the producing Web service 140, 150).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, the system 100 and methods 200, 300 are particularly well-suited for systems and platforms for providing Web services (i.e., the Web services are the components exchanging information) with specific examples provided for a web-based SOA using UML formats for the conceptual model and XSD for formatting concreted data models (i.e., the conceptual model or IM is converted into the data model definition language of XML). However, those skilled in the art will readily understand that the concepts of the invention can be implemented using differing modeling languages and differing formats for concrete data models, and these broader constructs are considered within the breadth of the above description.

We claim:

1. A computer-based method for enforcing compliance with data definitions in a source-of-record conceptual model of a service orientated architecture (SOA) network, comprising:
    storing a set of data models having a content based on the data definitions of the conceptual model, the data models defining model parameter definitions used in communicating data among each registered service of a plurality of registered services of the SOA network, wherein only services including data definitions that match the model parameter definitions are registered in a service registry storing the plurality of registered services in a service repository;
    providing a conceptual model validator having access to the data models that define model parameter definitions used in communicating data between each of the plurality of registered services and positioned between the service registry storing the plurality of registered services and a plurality of unregistered services each having a description of service with a data descriptor providing data definitions for service parameters related to communication of data with respect to the unregistered service;
    with the conceptual model validator, intercepting a plurality of registration requests, each registration request corresponding to one unregistered service of the plurality of unregistered services, to:
        parse each registration request to identify the data definitions for the service parameters related to communication of data with respect to the corresponding unregistered service;
        compare each of the identified data definitions of the registration request with a corresponding one of the model parameter definitions of the conceptual model; and
        determine that each of the identified data definitions of the registration request match with the corresponding one of the model parameter definitions; and
    registering at least one registration request if and only if each of the identified data definitions of the registration request match with the corresponding one of the model parameter definitions by deploying the unregistered service associated with the at least one registered registration request into the service registry such that the deployed unregistered service is operable to communicate data with each of the plurality of registered services of the SOA network via the model parameter definitions of the conceptual model.

2. The method of claim 1, further comprising rejecting at least one registration request and not deploying the one corresponding unregistered service into the service registry based on determining that one or more of the identified data definitions of the at least one registration request do not match with the corresponding one of the model parameter definitions.

3. The method of claim 2, wherein the registration request is rejected when the conceptual model validator cannot locate one of the service parameters of the corresponding unregistered service in the model parameter definitions used in communicating data between services of the SOA network.

4. The method of claim 1, further comprising generating the set of data models from the conceptual model, the model parameter definitions have a format selected for implementation by the registered services.

5. The method of claim 4, wherein the data definitions for the service parameters are configured in the format used for the model parameter definitions.

6. The method of claim 5, wherein the generating of the data models comprises creating a schema using eXtensible Markup Language (XML) Schema Definitions (XSDs).

7. The method of claim 1, wherein the conceptual model validator flags the registration request as validated when it is determined that each the identified data definitions of the registration request match with the corresponding one of the model parameter definitions.

8. The method of claim 7, further comprising a consuming service accessing the service repository prior to consuming information from the one of the registered services, using the consuming service to determine the presence of the validation flag, and when the validation flag is determined present, consuming the information from the one of the registered services.

9. A computer system adapted for validating conformance with a conceptual model of data definitions utilized by services in an enterprise software platform, comprising:
    at least one processor and memory;
    a storage device storing data models comprising data definitions based on the conceptual model data definitions at least including model parameter definitions used in communicating data between services of a service orientated architecture (SOA) network, the storage device being communicatively linked to a services framework;
    a plurality of services communicating over the services framework by way of the model parameter definitions, the services each comprising a service interface with a description of services having a data descriptor including the model parameter definitions;
    a registry in communication with the services framework, the registry deploying a subset of the plurality of services in a service repository, the subset of the plurality of services in the service repository corresponding to a plurality of registered services, wherein only services including data definitions that match the model parameter definitions are registered in the registry; and a validator in communication with the services framework and the registry operating to identify the subset of the services to be deployed in the service repository by processing registration requests from the services and comparing the parameter definitions in the registration requests to the model parameter definitions of the data definitions of the data models in the storage device to determine compliance with the conceptual model data definitions, wherein the validator is positioned in a communication path between the services and the registry such that all registration requests transmitted by the service are intercepted by the validator and validated by the processing and the comparing to register registration requests if and only if the registration request includes data definitions that match with a corresponding one of the conceptual model data definitions, the determined compliance indicative of the operability of the service corresponding to the registration request to communicate data with each of the plurality of registered services.

10. The system of claim 9, wherein the validator comprises a parser parsing the registration requests to extract the parameter definitions from the registration requests.

11. The system of claim 10, wherein the registration requests are formatted in the Web Services Description Language (WSDL).

12. The system of claim 9, wherein the validator comprises a comparing mechanism for determining if each of the parameter definitions in the registration requests matches a corresponding one of the model parameter definitions of the data definitions of the data models.

13. The system of claim 12, wherein the comparing mechanism further operates to determine if any of the parameter definitions in the registration requests do not have a corresponding one of the model parameter definitions of the data definitions of the data models and when no corresponding one of the model parameter definitions of the data definitions is found, the validator rejects the registration request for deployment by the registry to the service repository.

14. A method for validating information of a component against a conceptual model during service registration in a computer system, comprising:
receiving a registration request from a component of the computer system, the registration request comprising a plurality of data definitions at least one of which comprises a data definition used in communicating data with the component;
parsing the registration request to extract each of the component data definitions including the data definition used in communicating data with the component;
determining if each of the extracted component data definitions matches a model data definition, wherein the model data definitions are constructed based on the conceptual model; and
when all of the extracted component data definitions are matched to one of the model data definitions including the data definition used in communicating data with the component, registering the component with a component registry including a plurality of registered components if and only if each of the extracted component data definitions match with a corresponding one of the model data definitions, wherein the registering of the component with a component registry is indicative of the operability of the component to communicate data with each of the plurality of registered components of the component registry via the model data definitions, and wherein only components including extracted component data definitions that match the model data definitions are registered in the component registry storing the plurality of registered components in a component repository.

15. The method of claim 14, wherein the component is a Web service and the registration request is formatted in as a Web Services Description Language (WSDL) registration request with a service description.

16. The method of claim 14, further comprising generating the model data definitions from data definitions in the conceptual model, wherein the model data definitions are configured to have a format comparable to a format of component data definitions of the registration request.

17. The method of claim 14, wherein the receiving, the parsing, and the determining are performed by a validator mechanism positioned between the component and the component registry, whereby transmittal of the registration request to the component registry is controlled by the validator mechanism.

18. The method of claim 17, further comprising receiving additional registration requests and repeating the receiving, the parsing, the determining, and the registering for each of the additional registration requests.

19. A computer system adapted for validating information of a component against a conceptual model during service registration in the computer system, comprising:
at least one processor and memory; and
a validator in communication with a services framework and a registry, the validator being operative to:
receive a registration request from a component of the computer network, the registration request comprising a plurality of data definitions at least one of which comprises a data definition used in communicating data with the component,
parse the registration request to extract each of the component data definitions including the data definition used in communicating data with the component, and
determine if each of the extracted component data definitions matches a model data definition, wherein the model data definitions are constructed based on the conceptual model;
wherein, when all of the extracted component data definitions are matched to one of the model data definitions including the data definition used in communicating data with the component, the validator is operative to register the component with the registry that includes a plurality of registered components if and only if each of the extracted component data definitions match with a corresponding one of the model data definitions, wherein the registering of the component with the registry is indicative of the operability of the component to communicate data with each of the plurality of registered components of the registry via the model data definitions, and wherein only components including extracted service data definitions that match the model data definitions are registered in the registry storing the plurality of registered components in the repository.

20. The system of claim 19, wherein the component is a Web service and the registration request is formatted in as a Web Services Description Language (WSDL) registration request with a service description.

21. The system of claim 19, wherein the validator is further operative to generate the model data definitions from data definitions in the conceptual model, wherein the model data definitions are configured to have a format comparable to a format of component data definitions of the registration request.

22. The system of claim 19, wherein the validator is positioned between the component and the component registry, whereby transmittal of the registration request to the component registry is controlled by the validator.

23. The system of claim 21, wherein the validator is operative to receive registration requests from a plurality of components to determine whether each of the plurality of components are to be registered in the registry.

\* \* \* \* \*

UNITED STATES PATENT AND TRADEMARK OFFICE
CERTIFICATE OF CORRECTION

| | | |
|---|---|---|
| PATENT NO. | : 9,438,680 B1 | Page 1 of 1 |
| APPLICATION NO. | : 11/151968 | |
| DATED | : September 6, 2016 | |
| INVENTOR(S) | : Bingham, Jr. et al. | |

It is certified that error appears in the above-identified patent and that said Letters Patent is hereby corrected as shown below:

In the Specification

In Column 4, Line 40, delete "W" and insert -- IP --, therefor.

In Column 5, Line 32, delete "(1M)" and insert -- (IM) --, therefor.

In the Claims

In Column 10, Line 34, in Claim 7, after "each" insert -- of --.

In Column 13, Line 9, in Claim 23, delete "claim 21," and insert -- claim 19, --, therefor.

Signed and Sealed this
Eighteenth Day of July, 2017

Joseph Matal
*Performing the Functions and Duties of the
Under Secretary of Commerce for Intellectual Property and
Director of the United States Patent and Trademark Office*